June 6, 1939.  C. B. BOWMAN  2,161,127
FILTER
Filed Jan. 11, 1937    2 Sheets-Sheet 1
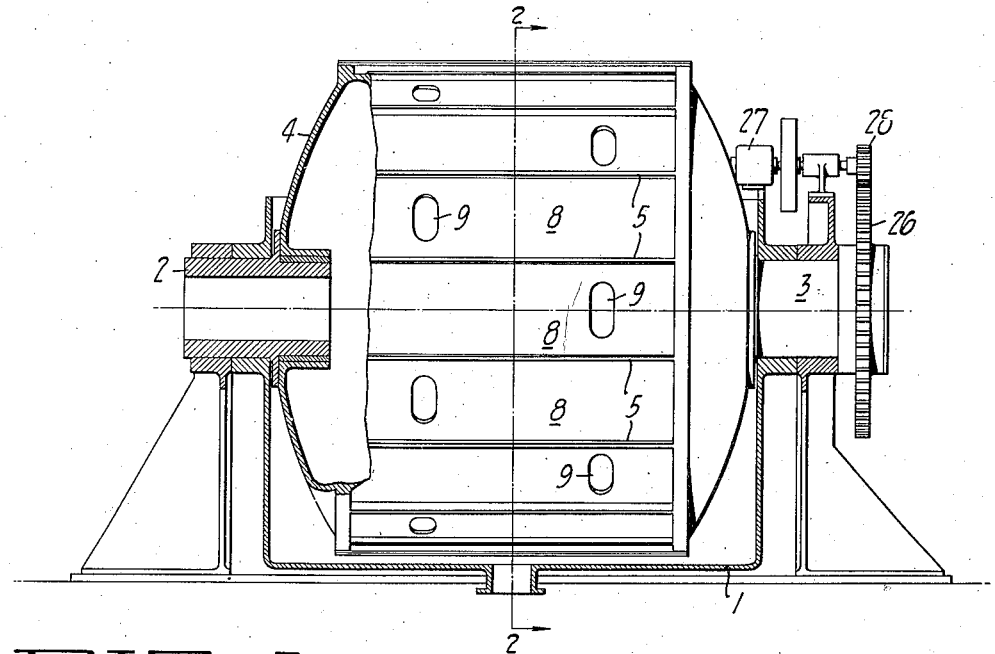
FIG_1_
FIG_2_
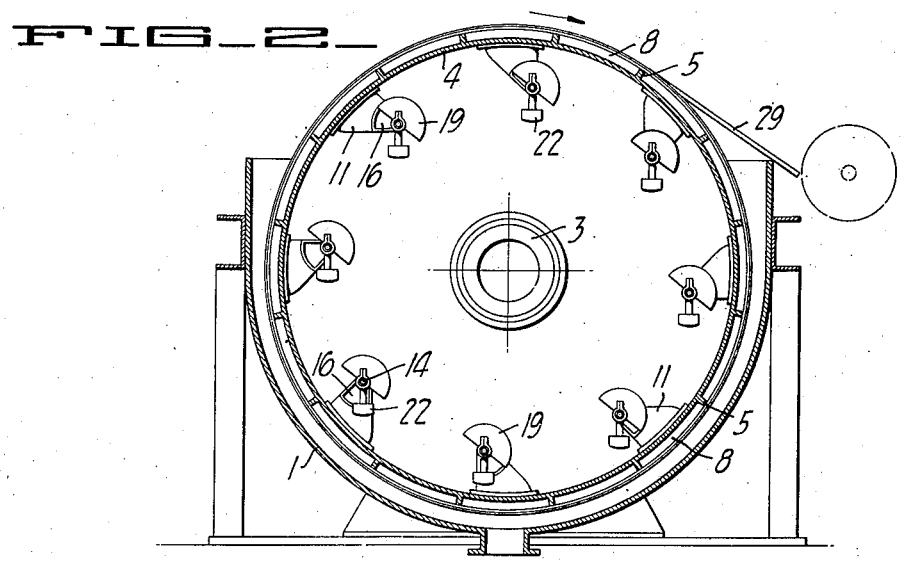
INVENTOR.
Clarence Bliss Bowman
BY
　　　ATTORNEY.

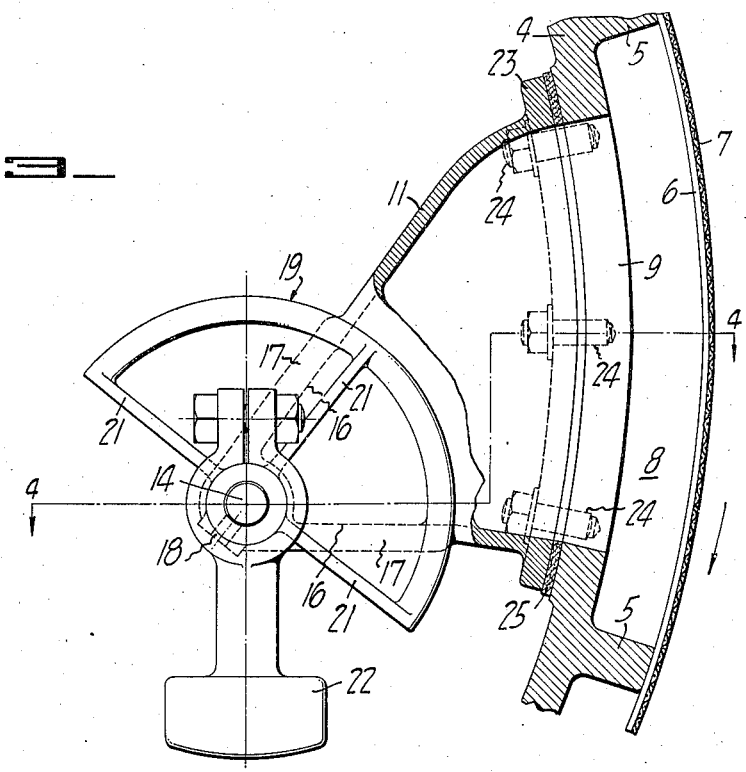
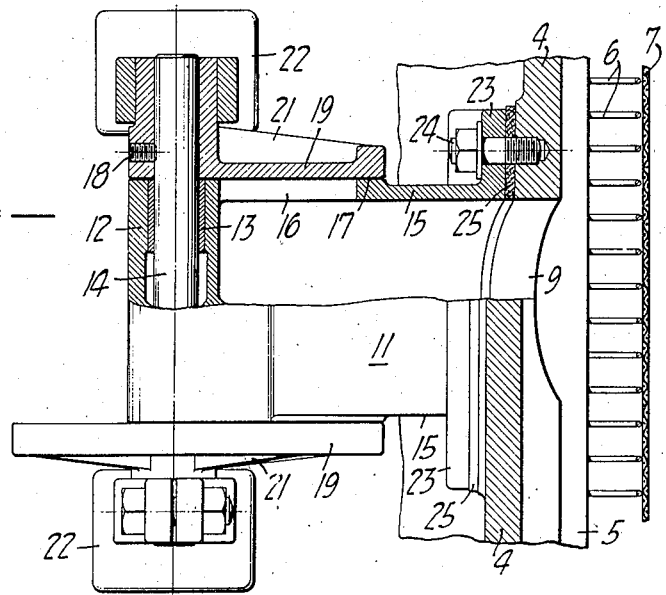

Patented June 6, 1939

UNITED STATES PATENT OFFICE 2,161,127

FILTER

Clarence Bliss Bowman, Oakland, Calif., assignor to Oliver United Filters Incorporated, San Francisco, Calif., a corporation of Nevada Application January 11, 1937, Serial No. 119,916

9 Claims. (Cl. 210—202)

This invention relates to rotary drum filters and in particular to an improvement in the gravity operated valve shown and described in the Young Patent 2,052,156 of August 25, 1936. Although the valve shown and described in the Young patent has been made to operate successfully in several installations, it is nevertheless subject to one rather serious objection. In order to maintain a vacuum within the drum, the clearance between the valve port and valve gate must lie within certain predetermined limits. Wear of the valve stem and the bearings within which it is journaled increases this clearance and in time it becomes so great that the vacuum within the drum cannot be maintained.

In general, the object of this invention is to provide a valve wherein wear in the valve stem and its bearings in no way affects the clearance between the valve port and the valve gate.

More specifically, the object of my invention is the provision of a valve wherein the valve body is provided with a lateral valve port adapted to be closed by means of a vertically mounted gravity operated gate.

The invention possesses other advantageous features, some of which with the foregoing will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Figure 1 is an elevation of a rotary drum filter with parts broken away and with the tank in section in order better to illustrate its construction.

Figure 2 is a section taken on the line 2—2 of Figure 1, showing valves embodying the objects of my invention installed in the filter.

Figure 3 is an enlarged detail and elevation of the valve shown in Figure 2.

Figure 4 is a section taken on the line 4—4 of Figure 3.

As shown in Figures 1 and 2, a valve embodying the objects of my invention may be incorporated in a sectionalized rotary drum vacuum filter comprising a tank 1, to the ends of which are journaled hollow trunnions 2 and 3. Secured to the inner ends of these trunnions is a rotary drum 4 provided on its periphery with a number of longitudinally spaced division strips 5. Peripherally disposed about the division strips 5 is a wire winding 6 which serves as a support for the filter medium 7. It will therefore be seen that the drum 4, division strips 5, and filter medium 7, define filtrate compartments or sections 8. Each compartment 8 is made to communicate with the interior of the drum by means of intake openings 9, which if necessary may be staggered as shown in Figure 1. For purposes of convenience, that portion of each compartment 8 defined by the drum may be considered as the floor of the compartment.

Bolted within the drum 4 in registration with each of the intake openings 9 is a valve body 11. Formed in the end of the valve body opposite the intake opening 9 is a bearing 12 within which are disposed bushings 13 for accommodating a valve stem 14. The opposed side walls 15 of the valve body 11 are provided with valve ports 16 surrounded or defined by a ground boss 17. Adjustably secured to the valve stem 14 by means of set screws 18 are semi-circular gate valves 19 adapted to register with the valve ports 16 during the interval that the filtrate compartment 8 to which the valve is secured is being discharged. The inner faces of the gate valves 19 should be finished, and the clearance between the faces of these gate valves and the finished machine bosses 17 should be in the order of twenty-five thousandths of an inch. In order to keep the gate valves 19 from warping, they should be reinforced by means of webs 21. The gate valve 19 is maintained in any predetermined desired position with relation to the axis of the stem 14 by means of a depending counterweight 22 bolted to the outer ends of the stem 14. The inner end of the valve body 11 is provided with a flange 23, for accommodating bolts 24 by means of which the valve body may be secured to the drum 4. In order to insure an air tight seal between the valve body and the drum 4, a gasket 25 may be interposed between these two members as best shown in Figures 3 and 4.

To the trunnion 3 is secured a driving gear 26 adapted to be driven by any suitable means such as an electric motor 27 through a reduction gear 28. The outer end of the trunnion 2 should be connected with a suitable source of vacuum (not shown) so that the interior of the drum may be maintained under a subatmospheric pressure during its entire cycle of operation.

The material to be filtered is continuously fed to the tank 1 by any suitable means and its solid content is deposited as a cake on the outer face of the filter medium during the rotation of the drum through the tank. In order continuously to discharge the cake deposited on the drum, a doctor or scraper 29 is secured to the tank 1 or to the framework supporting the tank. However, in order to permit the scraper 29 to discharge the cake, the pressure on both sides of the filter medium should be equalized, and as explained in the Young Patent 2,052,156 above referred to, it is for this purpose that my gravity operated valve has been provided. As shown in Figure 2, the gate valves 19 should begin to close the valve ports 16 approximately at the zenith of the drum so that the valve ports are completely closed at the time that the scraper 29 begins to operate.

Since the valve stem 14 is located at right angles to the valve port 16 and to the gate 19, any wear in the bearing 12 and the valve stem 14 in no way affects the clearance between the machined surfaces of the gate 19 and the bosses 17 of the valve body 11. Furthermore, it is to be noted that the total area of the valve ports 16 on either side of the valve body 11 can if desired be made greater than the corresponding valve port of the valve disclosed in the Young patent.

Although a valve body having a single valve port and therefore only a single gate is operable, the use of a pair of opposed valve ports and a gate for each port is preferable for then the valve is balanced with respect to the action of the vacuum within the drum as well as with respect to weight. It should also be noted that the location of the gates 19 on the stem 14 may be adjusted by means of the set screws 18, thereby permitting the clearance between the gates and their corresponding valve ports to be adjusted.

I claim:

1. A rotary drum for continuous filters provided on its outer surface with independent filtrate compartments, each compartment having an opening formed in its floor; a valve body secured at its inner end to each of said compartments in registration with the opening therein; a port formed in the side of each of said bodies; a stem journaled in the outer end of said body at right angles to its port; a gate secured to said stem and adapted to register with said port once during each revolution of said drum; and means associated with said gate for maintaining it in a predetermined position with respect to the axis of said stem.

2. A rotary drum for continuous filters provided on its outer surface with independent filtrate compartments, each compartment having an opening formed in its floor; a valve body secured at its inner end to each of said compartments in registration with the opening therein; a port formed in the side of each of said bodies; a stem journaled in the outer end of said body at right angles to its port; a gate secured to said stem and adapted to register with said port once during each revolution of said drum; and a weight associated with said gate for maintaining it in a predetermined position with respect to the axis of said stem.

3. In a continuous sectionalized rotary drum filter wherein the interior of the drum is maintained under the influence of vacuum, a valve for closing and establishing communication between the interior of the drum and the drum sections comprising: a valve body provided at one end with an intake opening and at one side with a valve port; a valve stem journaled in said body opposite said intake opening and at right angles to said valve port; a valve gate secured to said stem and arranged to open and close said valve port; and a counterweight associated with said gate for maintaining said gate in a predetermined position with respect to the axis of said stem.

4. In a continuous sectionalized rotary drum filter wherein the interior of the drum is maintained under the influence of vacuum, a valve for closing and establishing communication between the interior of the drum and the drum sections comprising: a valve body provided at one end with an intake opening and at one side with a valve port; a valve stem journaled in said body opposite said intake opening and at right angles to said valve port; a valve gate secured to said stem and arranged to open and close said valve port; and a counterweight adjustably secured to said stem for maintaining said gate in a predetermined position with respect to the axis of said stem.

5. In a continuous sectionalized rotary drum filter wherein the interior of the drum is maintained under the influence of vacuum, a valve for closing and establishing communication between the interior of the drum and the drum sections comprising: a valve body provided at one end with an intake opening and at one side with a valve port; a valve stem journaled in said body opposite said intake opening and at right angles to said valve port; a valve gate adjustably secured to said stem and arranged to open and close said valve port; and a counterweight associated with said gate for maintaining said gate in a predetermined position with respect to the axis of said stem.

6. A revolving filter comprising: a continuous series of contiguous filtrate compartments; an opening formed in the floor of each of said compartments; a valve body secured at its inner end to each of said compartments in registration with the opening therein; a port formed in the side of each of said bodies; a stem journaled in the outer end of said body at right angles of its port; a gate secured to said stem and adapted to register with said port once during each revolution of said filter; and means associated with said gate for maintaining it in a predetermined position with respect to the axis of said stem.

7. A revolving filter comprising: a continuous series of contiguous filtrate compartments; an opening formed in each of said compartments; a valve body secured at its inner end to each of said compartments in registration with the opening therein; a port formed in the side of each of said bodies; a stem journaled in the outer end of said body at right angles to its port; a gate secured to said stem and adapted to register with said port once during each revolution of said filter; and means associated with said gate for maintaining it in a predetermined position with respect to the axis of said stem.

8. A filter comprising: a filter compartment; means for causing said compartment to traverse a closed path; a valve body secured to and in communication with said compartment; an outlet port in the side of said body; a stem journaled in said body adjacent and at right angles to said outlet port; a gate secured to said stem and adapted to register with said outlet port once during each cycle of travel of said compartment; and means associated with said gate for maintaining it in a predetermined position with respect to the axis of said stem.

9. A filter comprising: a filter compartment; means for causing said compartment to travel a closed path; a valve body secured to and in communication with said compartment; an outlet port in the side of said body; a stem extending outwardly from said body at right angles to said outlet port; a gate mounted on said stem and adapted to register with said outlet port once during each cycle of travel of said compartment; and means associated with said gate for maintaining it in a predetermined position with respect to the axis of said stem.

CLARENCE BLISS BOWMAN.